Oct. 31, 1939.  C. D. STEWART  2,177,962
BRAKE MECHANISM
Filed Feb. 28, 1939   3 Sheets-Sheet 1

INVENTOR
CARLTON D. STEWART
BY
*M. Higgins*
ATTORNEY

Oct. 31, 1939.  C. D. STEWART  2,177,962

BRAKE MECHANISM

Filed Feb. 28, 1939  3 Sheets-Sheet 2

INVENTOR
CARLTON D. STEWART
BY
ATTORNEY

Oct. 31, 1939.  C. D. STEWART  2,177,962
BRAKE MECHANISM
Filed Feb. 28, 1939  3 Sheets-Sheet 3

INVENTOR
CARLTON D. STEWART
BY
ATTORNEY

Patented Oct. 31, 1939

2,177,962

UNITED STATES PATENT OFFICE 2,177,962

BRAKE MECHANISM

Carlton D. Stewart, Wilkinsburg, Pa., assignor to The Westinghouse Air Brake Company, Wilmerding, Pa., a corporation of Pennsylvania Application February 28, 1939, Serial No. 258,938

22 Claims. (Cl. 188—58)

This invention relates to brake mechanisms for railway vehicle trucks of the type in which, in effecting an application of the brakes, downwardly directed forces set up in the mechanisms upon the frictional braking engagement of one or more brake shoes or pairs of brake shoes with a wheel and axle assembly of the truck will be transmitted through the medium of an additional brake shoe or pair of brake shoes to the assembly instead of to the truck frame; the additional brake shoe or shoes also serving to brake the assembly.

As heretofore proposed in my pending application Serial No. 214,517, filed June 18, 1938, this type of brake mechanism may comprise a brake drum which is secured to a wheel and axle assembly for rotation therewith and may further comprise two spaced pairs of brake shoes which are disposed in clasp arrangement about the drum, and are supported by a brake carrier pivotally carried by the truck frame and which are adapted to actuate the brake carrier into supporting and braking engagement with the brake drum, the actual engagement of the carrier with the assembly being preferably accomplished through the medium of a third pair of brake shoes which are connected to the carrier. The clasp arranged brake shoes are actuated by vertically disposed brake levers, usually a brake cylinder lever and a dead lever operatively connected to the brake cylinder lever and fulcrumed to the brake carrier. While this system of brake levers is suitable for more designs of railway vehicles it has been found that in some modern passenger car designs the clearance space between the truck and the car body is so limited as to preclude or at least render difficult the use of brake levers of the proper length.

An object of the present invention is to provide a novel brake mechanism of the above mentioned type which will be free of the above mentioned objections and yet be as effective and efficient as a mechanism embodying the usual system of brake levers.

Another object of the invention is to provide a brake mechanism of the above mentioned type with means for adjusting each of the three brake shoes independently of the others.

Other objects and advantages will appear in the following more detailed description of the invention.

In the accompanying drawings

Figure 1:
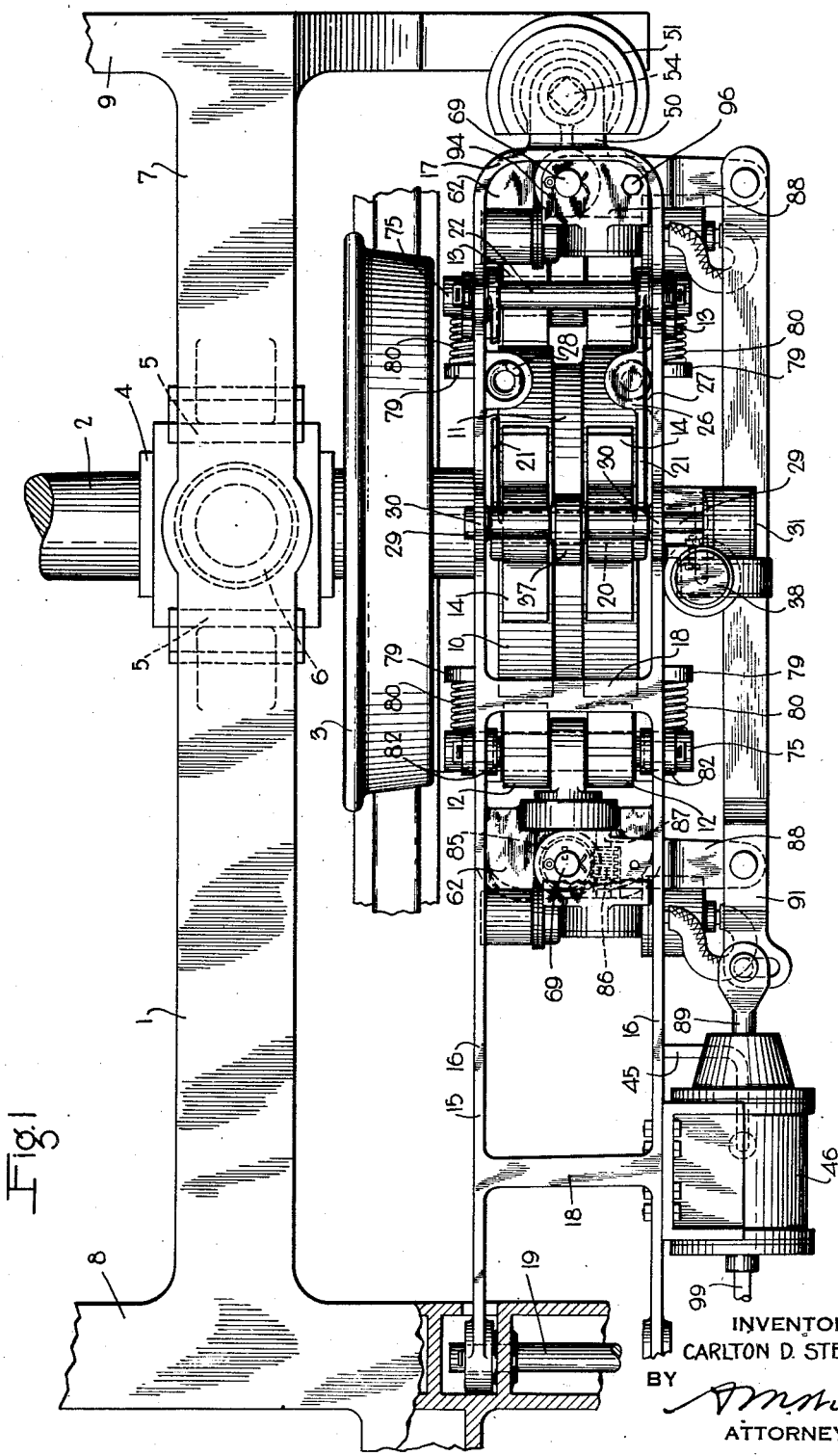
Figure 2:
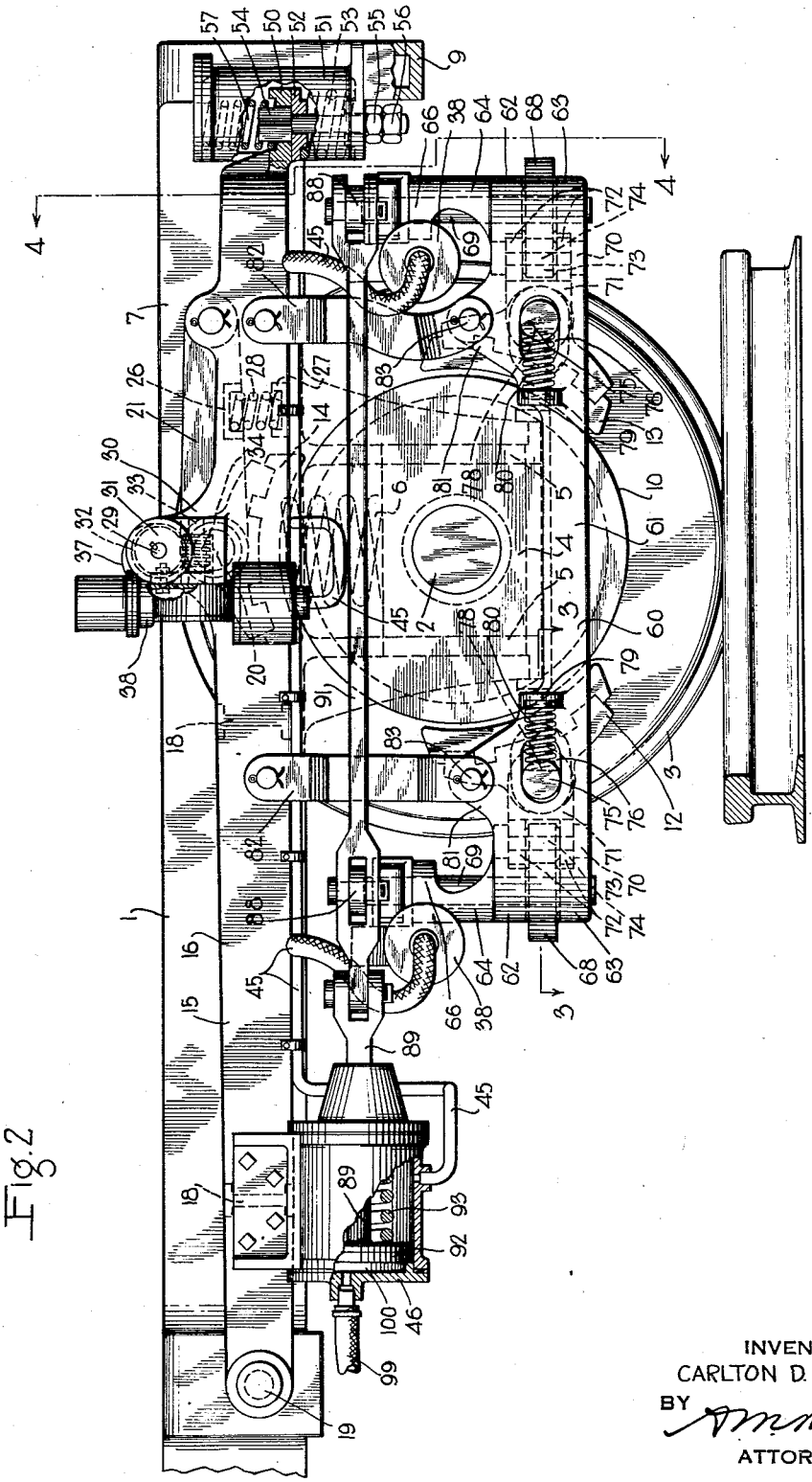
Figure 3:
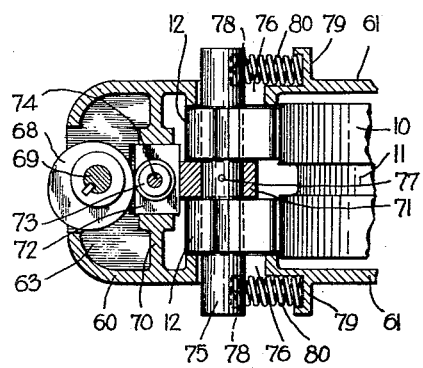
Figure 4:
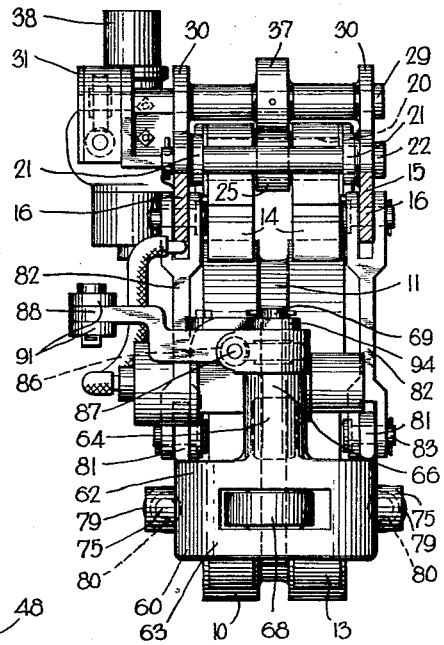
Figure 5:
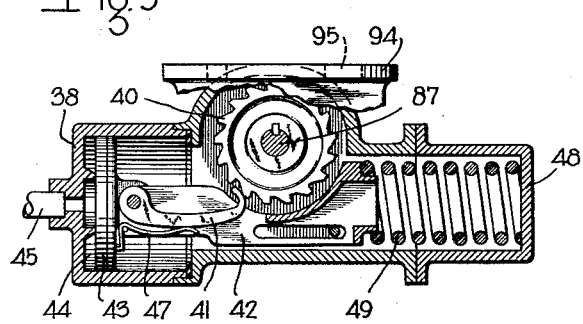
Figure 6:
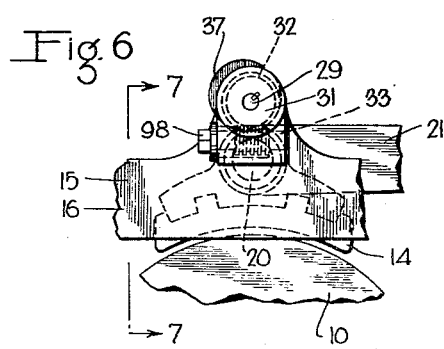
Figure 7:
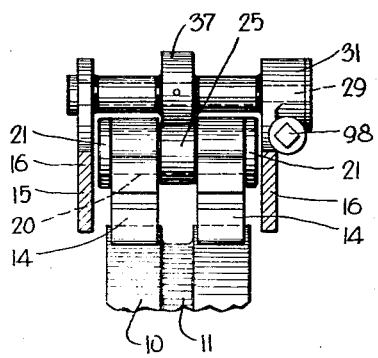

Fig. 1 is a fragmentary plan view of a portion of a railway vehicle truck embodying the invention; Fig. 2 is a side elevational view of the same; Figs. 3 and 4 are fragmentary detail sectional views taken on the lines 3—3 and 4—4, respectively, of Fig. 2, the truck frame being omitted; Fig. 5 is an enlarged detail sectional view of a slack adjuster motor of the mechanism; Fig. 6 is a fragmentary side elevational view of a manually controlled slack adjuster embodied in the brake carrier of the brake mechanism and Fig. 7 is a vertical sectional view of the same taken on the line 7—7 of Fig. 6.

For illustrative purposes the invention is shown embodied in a railway vehicle truck of the type having a cast metal truck frame 1 and the usual longitudinally spaced wheel and axle assemblies, each of which assemblies may comprise an axle 2 and laterally spaced wheels 3 which may be secured in any desired manner to the axle for rotation therewith.

Between the wheels and at each side of the truck the axle of each wheel and axle assembly is suitably journaled in journal bearings 4 which are loosely mounted between spaced downwardly depending pedestal jaws 5 preferably formed integral with the truck frame. The truck frame is resiliently supported from the wheel and axle assemblies by springs 6 for vertical movement relative to the assemblies, the springs in the present embodiment of the invention being seated on the journal bearings.

The truck frame differs somewhat from the conventional type of frame in that the side frames 7 thereof are inset or recessed opposite each wheel to accommodate the wheel, and in that the pedestal jaws between which the journal bearings 4 are mounted, are disposed inboard of the wheels. The side frames 7 may be integrally connected together in the usual manner by transversely extending transoms 8 and transversely extending end pieces 9.

It will here be understood that each wheel and axle assembly may be provided with two of the brake mechanisms hereinafter fully described, and that both of these mechanisms may be substantially identical with each other and may operate independently, although they will have substantially the same operating characteristics. In view of this only one such brake mechanism, one end of a wheel and axle assembly and the necessary portions of the truck frame have been shown in the drawings, and for the sake of simplicity and clearness the following description will be more or less limited to what is shown.

Located outboard of the wheel 3 but adjacent thereto is a brake drum 10 which is secured in any desired manner to the outer end of the axle 2 for rotation therewith. This drum is preferably provided with two laterally spaced peripheral braking surfaces which are separated by a central peripheral groove 11, but which if desired may be made continuous across the width of the drum. These braking surfaces are adapted to be frictionally engaged by spaced pairs of brake elements 12, 13 and 14 radially arranged about the drum, the elements 12 and 13 being located below the horizontal center line of the drum and at opposite sides thereof, and the elements 14 being located above the drum and centered on the vertical center line thereof. It will here be understood that each brake element may comprise the usual brake shoe and a brake shoe head and since this combination of head and shoe is well known by those skilled in the brake art, the elements will, for the sake of clearness of description, be hereinafter referred to by either the term brake shoe or brake shoes.

The brake shoes 14 are pivotally carried by a combined brake lever and brake carrier 15 which extends longitudinally of the truck on the outer side of the adjacent truck side frame 9 and above the horizontal center line of the drum.

In the present embodiment of the invention this brake carrier 15 is shown as comprising laterally spaced longitudinally extending vertically disposed side pieces 16 which are integrally connected together at their outer ends by a vertically disposed transversely extending end piece 17, and are connected together intermediate their ends by longitudinally spaced vertically disposed transversely extending webs 18 of I-form in cross section. The inner end of the carrier is pivotally connected by means of a pin 19 to the side frame of the truck, which pin is preferably located at or near the transverse center line of the truck.

The brake shoes 14 are located between the side pieces 16 of the brake carrier and are mounted on a transversely extending pin 20 which is carried by the inner ends of two laterally spaced longitudinally extending arms 21 which are located between the side pieces 16 and arranged one adjacent each of the side pieces and which are pivotally connected at their outer ends to the side pieces by means of a transversely extending pin 22. The pin 20 is preferably of such a length that the end faces thereof will be flush with the outer side faces of the arms and since as shown there is only the usual slight operating clearance such faces and the inner surfaces of the side pieces 16, said side pieces will prevent the pin from accidentally shifting, in directions transversely of the carrier, out of supporting relationship with one or the other of the arms 21.

Rotatably mounted on the pin 20 and located between the brake shoes 14 is a spacer 25 which maintains the brake shoes spaced apart laterally, lateral movement of the shoes in directions away from each other being prevented by the arms 21 which in turn are prevented from moving in these directions by the side pieces 16 of the carrier.

Each arm 21, intermediate its ends, is provided with a spring seat 26, and located directly below such seat is a spring seat 27 which is carried by the adjacent side piece 16 of the brake carrier. Interposed between and operatively engaging each of these sets of spring seats is a vertically disposed spring 28. These springs act to yieldably maintain the brake shoes 14 in their release position with relation to the brake carrier as will hereinafter more fully appear.

Located above the pin 20 is a transversely extending shaft 29 which is rotatably mounted in lugs 30 extending upwardly from the side pieces 16 of the brake carrier. The outer end of this shaft projects beyond the vertical plane of the major portion of the outer side pieces 16 and at its end is journaled in the vertical wall 31 of a hollow gear casing which is formed integral with this side piece of the carrier.

Contained in the gear casing is a gear wheel 32 which is rigidly secured to the shaft 29 so that it will, when rotated, effect rotation of the shaft.

Located below the shaft 29 and extending at right angles thereto longitudinally of the brake carrier is a shaft 33 which is rotatably mounted in the gear casing and which has formed thereon or rigidly secured thereto a worm 34 which meshes with the teeth of the gear wheel 32, which worm is adapted to transmit rotary motion from the shaft 33 to the gear wheel 32 and thereby to the shaft 29.

Located centrally between the side pieces 16 of the brake carrier and secured to the shaft 29 for rotation therewith is a cam 37 having a peripheral surface which as will hereinafter more fully appear is at all times in contact with the outer surface of the spacer 25.

One end of the shaft 33 projects beyond the gear casing and into the casing of a vertically disposed slack adjuster, fluid pressure controlled motor 38 which is rigidly secured to the brake carrier. As will hereinafter appear there are two other slack adjuster motors 38 employed in the equipment which motors are shown in Fig. 5 of the drawings and each employs the same adjusting mechanism which comprises a ratchet wheel 40 which is adapted to be operatively engaged by a pawl 41 which is pivotally connected to the stem 42 of an actuating fluid pressure controlled piston 43 contained in a piston chamber 44 which is connected through a conduit 45 to a brake cylinder 46 rigidly secured to the outer side piece 16 of the brake carrier. Secured to the piston stem 42 is a spring 47 which at all times acts to urge the pawl 41 toward the ratchet wheel 40. Interposed between and operatively engaging the end of the piston stem 42 and an adjacent wall 48 of the motor casing is an actuating spring 49.

In the motor 38 secured to the brake carrier the ratchet wheel 40 is rigidly secured to the end of the shaft 33 which projects into the casing of the motor. It should here be mentioned that the cam 37, shafts 29 and 33, worm gearing connecting the shafts, and the motor 38 for controlling the operation of the shaft 33 constitutes an automatic slack adjusting mechanism for adjusting the brake shoes 14 to compensate for wear in the manner hereinafter fully described.

The end piece 17 of the brake carrier 15 is provided with a longitudinal extension 50 which extends into a pocket 51 carried by the truck frame, which extension rests on a spring seat 52 which is supported upon a release spring 53 resting on the bottom wall of the pocket 51.

Extending through a central opening in the spring seat 52 and an aligned opening in the bottom wall of the pocket 51 is a vertically disposed bolt 54 having a head at its upper end, which head is accommodated by an opening in the extension 50 and engages the spring seat. The lower end of this bolt is screw threaded and is provided with a stop nut 55 which, when the brake carrier 15 is in its normal release position, as shown in the drawings, will engage the bottom surface of the bottom wall of the pocket 51 and thereby prevent the release spring from acting to move the brake carrier upwardly beyond such position. The lower end of the bolt is also provided with a check nut 56 which is adapted to lock the stop nut against accidental movement from its proper position on the bolt.

Interposed between and engaging the upper surface of the extension 50 of the brake carrier and the lower surface of the top wall of the pocket 51 is a spring 57 which acts to maintain the beam in close contact with the spring seat 52, thereby preventing chattering between the beam and spring seat when the truck is subjected to the usual service shocks. If, when the brakes are released, the truck frame should be caused to temporarily move downwardly relative to the wheel and axle assembly a sufficient distance to cause the brake shoes 14 to engage the brake drum 10, as may be the case when lading is suddenly deposited in the vehicle body, the spring 57 will yield and permit the truck frame to move downwardly relative to the brake carrier thereby preventing possible damage of the carrier.

Located below the brake carrier 15 is a cradle member 60 which comprises laterally spaced longitudinally extending side pieces 61 which are integrally connected together at their ends by transversely extending vertically spaced horizontally disposed upper and lower end pieces or webs 62 and 63, respectively. Extending vertically upward from the upper end piece 62 of each end of the cradle member is a pedestal 64 which, in the present embodiment of the invention, is integral with the member and has at its upper end an integral horizontally disposed flat top flange 66.

Contained in the space between the upper and lower end pieces 62 and 63, respectively, of each end of the cradle member is a rotatable horizontally disposed cam 68 which is rigidly secured to a vertically disposed rotatable actuating shaft 69 journaled in these end pieces and in the flange 66.

Located a short distance inwardly from each end of the cradle member is a transversely extending vertically disposed web 70 which is integrally connected to the adjacent end pieces 62 and 63 and to the side pieces 61. This web 70 is provided with a central opening in which there is slidably guided the outer end of a brake shoe actuating member 71. This end of the member 71 is provided with upper and lower spaced jaws 72 between which there is a roller 73 carried by a pin 74 mounted in the jaws, which roller is adapted to be engaged by the peripheral surface of the cam 68. The inner end of the member 71 surrounds a transversely extending pin 75 which is slidably mounted at each end on the adjacent side piece 61 of the cradle member within a longitudinally extending slot 76. This inner end with the member is secured to the pin 75 by means of a vertically disposed pin 77 and as a consequence the member will prevent unwanted rotation of the pin.

The pairs of brake shoes 13 and 14 are rigidly secured to the pins 75, each pair of shoes being arranged one on each side of the inner end of an adjacent member 71.

The ends of the pins 75 project beyond the side pieces 61 of the cradle member and each of these ends is provided with a recess 78 which is open in the direction toward the brake drum 10. Interposed between and operatively engaging the end wall of this recess and a spring seat 79 projecting outwardly from the adjacent side piece 61 is a release spring 80.

Adjacent each end of the cradle member each of the side pieces 61 is provided with an upwardly extending lug 81 to which the lower end of a vertically disposed hanger 82 is pivotally connected by means of a pin 83, the upper end of the hanger being pivotally connected to one of the side pieces 16 of the brake carrier member 15. From this it will be apparent that the cradle member 60 and the parts carried thereby are carried by the carrier member 15 through the medium of the four hangers 82.

Above the flanges 66 of the pedestal portions 64 of the cradle member, each of the shafts 69 has rigidly secured thereto a horizontally disposed gear wheel 85 with which the thread of a driving worm 86 on a rotatable shaft 87 meshes, which shaft 87 is journalled in a horizontally disposed actuating arm 88. The inner end of this arm is journalled on the shaft 69 above and below the gear wheel 85 and extends outwardly to a point beyond the outer side piece 16 of the cradle member. The outer ends of the arms 88 are operatively connected together and to the brake cylinder piston rod 89 through the medium of a longitudinally extending shiftable bar 91, which piston rod is attached to the usual brake cylinder piston 92 operatively mounted in the brake cylinder casing. The brake cylinder piston is at all times subject to the pressure of the usual release spring 93 which is mounted within the brake cylinder casing at the non-pressure side of the piston.

One end of the worm actuating shaft 87 extends into the casing of the slack adjuster motor 38 and is rigidly secured to the ratchet wheel 40 of the motor. As shown in Fig. 5 the casing of this motor is provided with a flange 94 which is adapted to rest on the upper surface of the lever 88 and which is journalled on the upper end of the shaft 69, there being a suitable opening 95 provided in the flange for the reception of this end of the shaft. The flange 94 is rigidly secured to the lever 88 by means of one or more bolts 96 so that the motor is movable with the lever.

In Figs. 6 and 7 there is illustrated a manually operative slack adjuster for the brake shoes 14. In this mechanism the fluid pressure controlled motor 38 is omitted and the end 98 of the worm actuating shaft 33 which projects beyond the gear casing is made square in cross section for engagement by a wrench or other tool suitable for rotating the shaft. In all other respects the mechanism is the same as the slack adjusting mechanism of the apparatus shown in Figs. 1 to 5 inclusive. It will here be understood that the other two slack adjuster motors for actuating the shafts 87 may be omitted and like the shaft 33 may each have a square end for engagement by a wrench or other suitable tool. If all of the slack adjusters are made for manual operation only the conduit 45 leading from the brake cylinder 46 will of course be omitted and the port in the brake cylinder for connection with the conduit will be plugged.

*Operation*

When it is desired to effect an application of the brakes fluid under pressure is supplied in the usual manner through a conduit 99 to the pressure chamber 100 of the brake cylinder 46, causing the brake cylinder piston 92 and piston stem 89 and thereby the bar 91 to move in the direction toward the right hand as viewed in Figs. 1 and 2. The bar 91 as it is thus moved actuating the arms 88 to rotate the shafts 69 and thereby the cams 68 in a counterclockwise direction, rotary motion being transmitted from each of the arms to each shaft through the medium of the interengaging worm 86 and gear wheel 85.

The peripheral surfaces of the cams 68 are normally in contact with the rollers 73 of the brake shoe actuating members 71 and are yieldably maintained in this relationship while the brakes are released by the release springs 80 which act through the medium of the pins 75. These cams, when rotated as just described, act through the medium of the rollers 73 to cause the members 71 and thereby the pins 75 to move relative to the cradle member 60 in directions toward the brake drum 10, the pins in their travel carrying the brake shoes 12 and 13 into frictional engagement with the peripheral braking surfaces of the drum.

Now as the pressure on the brake shoes is increased by the action of the cams, the shoes 12 and 13 due to their location below the horizontal center line of the brake drum and to the pressure applied thereto by the action of the cams 68 move downwardly along the peripheral braking surfaces of the drum. These brake shoes as they thus move force the cradle member 60 downwardly causing the brake carrier 15 to rock relative to the truck frame in a clockwise direction about its pivot pin 19 against the opposing pressure of the spring 53, which acts on the outer end of the carrier.

The brake cylinder, cam 37, shaft 29, and the slack adjusting mechanism associated with this shaft, arms 21, springs 28 and brake shoes 14 move downwardly in unison with the brake carrier. When, due to the movement of the carrier, the brake shoes 14 engage the top of the brake drum 10 further downward movement of the carrier and thereby of the cradle member and parts carried by both the carrier and member is prevented. As the pressure on the brake shoes 12 and 13 increases they act through the medium of the cradle member 60 and hangers 82 to increase the pressure on the brake shoes 14. From this it will be apparent that when the brake shoes 14 are in engagement with the peripheral braking surface of the drum they will act to assist in braking the brake drum and thereby the wheel and axle assembly and will serve in combination with the brake carrier to transmit the major portion of the vertical forces set up in the brake mechanism, to the wheel and axle assembly instead of to the truck frame, thus the downwardly directed forces set up due to frictional braking engagement of the shoes 12 and 13 will not be permitted to act to pull the truck frame downwardly relative to the wheel and axle assembly. It should here be mentioned that if such forces were transmitted to the truck frame they would over power the truck frame supporting springs 6 and cause them to be compressed. In releasing the brakes these compressed springs would act to raise the truck frame and thereby maintain the brake shoes 12 and 13 in braking engagement with the brake drum until the brake cylinder pressure has been reduced an abnormal amount. This is objectionable in that it renders the brakes slow in releasing, prevents the proper gradual release of the brakes and results in an unnecessary loss of brake cylinder air in effecting such gradual release. Obviously in the present brake mechanism, since the forces set up in braking are not permitted to pull the truck frame downwardly relative to the wheel and axle assemblies these objectionable features are eliminated.

It should here be mentioned that since the cradle member is pivotally connected with the brake carrier it is freely adjustable with relation to the braking surfaces of the brake drum when air application is being effected. This will insure a uniform pressure on both of the clasp arranged brake shoes regardless of uneven wear of the brake shoes or slight manufacturing inaccuracies in the mechanism.

When it is desired to release the brakes fluid under pressure is vented through conduit 99 from the pressure chamber 100 of the brake cylinder. As the chamber is thus vented the release spring 93 acts to move the brake cylinder piston 92 and thereby the piston rod 89 and bar 91 to their release position as shown in Figs. 1 and 2, the bar 91 in its travel actuating the arms 88 to rotate the shafts 69 and cams 68 in a clockwise direction, the cams relieving the pressure on the rollers 73 and thereby on the members 71 so that the springs 80 acting on the pins 75 move the pins and thereby the brake shoes 12 and 13 away from the brake drum thus releasing the brakes.

As the brake shoes are thus moved out of engagement with the brake drum the release spring 53 raises the outer end of the brake carrier and all of the parts of the mechanism associated with the carrier to their normal position in which the brake shoes 14 will be out of engagement with the brake drum.

While the brakes are released and the truck is in transit, service shocks transmitted to the brake rigging may have a tendency to shift the cradle member 60 longitudinally of the truck relative to the brake carrier and wheel and axle assembly, but such a tendency will be effectively prevented by the brake cylinder 46 and release springs 80, the brake cylinder acting to prevent the rocking of the outer ends of the arms 88 and the springs 80 resisting rotation of the arms by the cradle member.

When the brake shoes 12 and 13 become worn to such an extent that the brake cylinder piston 92, in its travel toward application position, uncovers the port in the brake cylinder casing leading to the conduit 45 to the brake cylinder pressure chamber 100, fluid under pressure will flow from this chamber to the piston chamber 44 of each one of the slack adjuster motors 38 and cause the pistons 43 and piston stems 42 of such motors to move to their innermost positions against the opposing pressures of the springs 49.

During this movement of the piston stems the pawls 41 ratchet or idle over the teeth of the ratchet wheels 40 to a position for engagement with such teeth.

Now when, in releasing the brakes, the brake cylinder piston in its release movement uncovers the port connected to the conduit 45 with the non-pressure chamber of the brake cylinder, fluid under pressure is vented from the piston chambers 44 of the three slack adjuster motors 38 to the atmosphere by way of the conduit 45, non-pressure chamber of the brake cylinder and the usual operating clearance space between the brake cylinder piston rod 89 and the non-pressure head of the brake cylinder.

With these chambers thus vented the spring 49 of each motor acts to move the piston stem 42, piston 43 and pawl 41 from their innermost position to their outermost position as shown in Fig. 5, the pawl acting to rotate the ratchet wheel 40 and thereby rotate the shaft secured thereto.

It will here be noted that in the motor carried by the brake carrier the ratchet wheel 40 rotates the shaft 33 and worm 34 so as to rotate the gear wheel 32, shaft 29 and cam 37 in a counterclockwise direction. The cam as it is thus moved acts through the medium of the roller 25 and pin 20 to move the brake shoes 14 and inner ends of the arms 21 downwardly relative to the brake carrier 15 against the opposing pressure of the springs 28. As the piston 43 of the adjusting motor nears its outermost position the pawl 41 moves out of engagement with the ratchet wheel 40 and as a result the adjusting movement of the cam 37 ceases. The braking surfaces of the brake shoes 14 due to this adjusting operation will now be spaced away from the peripheral braking surfaces of the brake drum 10 its original distance.

In each of the motors carried by the cradle member 61 the ratchet wheel 40 when actuated imparts rotary motion to the shaft 87 and worm 86 so as to rotate the gear wheel 85, shaft 69 and cam 68 relative to the associated arm 88 in a counterclockwise direction as viewed in Figs. 1 and 3. This cam as it is thus moved acts through the medium of the roller 73, member 71 and pin 75 to move the brake shoes carried by the pin relative to the cradle member in a direction toward the brake drum 10. When due to the action of the piston 43 the pawl 41 is moved out of engagement with the ratchet wheel 40 the adjusting movement of the brake shoes ceases and the braking surfaces of the shoes will now be spaced their original distance from the braking surfaces of the brake drum.

It will here be understood that the brake cylinder release spring 93 acts through the medium of the bar 91 to prevent the adjusting mechanism from imparting adjusting movement to the arm 88, thus insuring the proper operation of the slack adjusting mechanism and the proper operation of the brake mechanism as a whole to control the application and release of the brakes.

When the design of the brake equipment is such that the wear of the brake shoes will not be uniform the ratchet wheels 40 and 41 of the motors 38 and pawls will be proportioned to provide the proper adjustment for each pair of brake shoes.

In Figs. 6 and 7 the shaft 33 of the slack adjusting mechanism for the brake shoes 14 is operable manually, otherwise the operation of the mechanism is identical with that of the motor driven mechanism shown in Figs. 1 and 2. When desired each of the other two slack adjusting mechanisms may be made of the manually operable type.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake mechanism for a railway vehicle truck wheel and axle assembly having a braking surface rotatable therewith, in combination, means carried by the frame of the truck and movable relative thereto into and out of braking and supporting engagement with said braking surface, brake elements disposed in clasp arrangement with relation to said braking surface and movable into and out of braking engagement with the surface, a structure carried by said means for supporting said clasp arranged brake elements, and mechanism operative to move said clasp arranged brake elements relative to said structure into braking engagement with said braking surface, said clasp arranged brake element when in braking engagement with the braking surface acting through the medium of said structure to move said means into braking and supporting engagement with the braking surface.

2. In a brake mechanism for a railway vehicle truck wheel and axle assembly having a braking surface rotatable therewith, in combination, means carried by the frame of the truck and movable relative thereto into and out of braking and supporting engagement with said braking surface, brake elements disposed in clasp arrangement with relation to said braking surface and movable into and out of braking engagement with the surface, a structure extending longitudinally of the truck and operatively carrying said clasp arranged brake elements, hangers connecting the opposite ends of said structure to said means in such a manner as to provide for longitudinal movement of the structure relative to the means and to the wheel and axle assembly, and mechanism operative to move said clasp arranged brake elements relative to said structure into braking engagement with said braking surface, said clasp arranged brake element when in braking engagement with the braking surface acting through the medium of said structure and hangers to move said means into braking and supporting engagement with the braking surface.

3. In a brake mechanism for a railway vehicle truck wheel and axle assembly having a braking surface rotatable therewith, in combination, means located above the axle of said wheel and axle assembly and carried by the frame of the truck movable relative to said frame into and out of braking and supporting engagement with said braking surface, brake elements disposed in clasp arrangement with relation to said braking surface and movable into and out of braking engagement with the surface, a structure located below the axle of said wheel and axle assembly and carried by said means for supporting said clasp arranged brake elements, and mechanism operative to move said clasp arranged brake elements relative to said structure into braking engagement with said braking surface, said clasp arranged brake elements when in braking engagement with the braking surface acting through the medium of said structure to move said means into braking and supporting engagement with the braking surface.

4. In a brake mechanism for a railway vehicle truck wheel and axle assembly having a braking surface rotatable therewith, in combination, means located above the axle of the wheel and axle assembly pivotally carried by the frame of the truck for movement relative to the truck into and out of braking and supporting engagement with said surface, brake elements disposed in clasp arrangement with relation to said braking surfaces and movable into and out of braking engagement with said surface, a structure located below the axle of said wheel and axle assembly and carried by said means for supporting said clasp arranged brake elements, and mechanism carried by said means and structure operative to move said clasp arranged brake elements relative to said structure into braking engagement with said braking surface, said clasp arranged brake elements when in braking engagement with the braking surface acting through the medium of said structure to move said means into braking and supporting engagement with the braking surface.

5. In a brake mechanism for a railway vehicle truck wheel and axle assembly having a braking surface rotatable therewith, in combination, a brake element movable into and out of engagement with said braking surface, a member carried by the frame of the truck and movable relative thereto for effecting engagement and disengagement of said element with said braking surface, brake elements disposed in clasp arrangement with relation to said braking surface and movable into and out of braking engagement with the braking surface, a structure carried by said member for supporting said clasp arranged brake elements, and means cooperating with said structure and clasp arranged brake elements operative to move the clasp arranged brake elements relative to the structure into braking engagement with said braking surface, said clasp arranged brake elements when in braking engagement with the braking surface acting through the medium of said structure to actuate said member relative to the truck frame to move the first mentioned brake element into engagement with said braking surface.

6. In a brake mechanism for a railway vehicle truck wheel and axle assembly having a braking surface rotatable therewith, in combination, means carried by the frame of the truck and movable relative thereto into and out of braking and supporting engagement with said braking surface, brake elements disposed in clasp arrangement with relation to said braking surface and movable into and out of braking engagement with the surface, a structure carried by said means for supporting said clasp arranged element, mechanism carried by said structure and operative to move said clasp arranged brake elements relative to the structure into braking engagement with said braking surface, and a brake cylinder operative to actuate said mechanism, said clasp arranged brake elements when in braking engagement with the braking surface acting through the medium of said structure to move said means into braking and supporting engagement with the braking surface.

7. In a brake mechanism for a railway vehicle truck wheel and axle assembly having a braking surface rotatable therewith, in combination, means carried by the frame of a truck and movable relative thereto into and out of braking and supporting engagement with said braking surface, brake elements disposed in clasp arrangement with relation to said braking surface and movable into and out of braking engagement with the surface, a structure carried by said means for supporting said clasp arranged brake elements, mechanism carried by said structure operative to move said clasp arranged brake elements relative to the structure into braking engagement with said braking surface, and actuating means for said mechanism carried by said means, said clasp arranged brake elements when in braking engagement with the braking surface acting through the medium of said structure to move said means into braking and supporting engagement with the braking surface.

8. In a brake mechanism for a railway vehicle truck wheel and axle assembly, in combination, a brake drum secured for rotation with said wheel and axle assembly, means carried by the frame of the truck and movable relative thereto into and out of braking and supporting engagement with said brake drum, a structure extending longitudinally of the truck located below the axle of said wheel and axle assembly and supported by said means, clasp arranged brake elements carried by said structure for longitudinal movement relative thereto into and out of braking engagement with said drum, mechanism carried by said structure operative to effect the operation of said clasp arranged brake elements, and a fluid pressure controlled brake cylinder operative to effect the operation of said mechanism, said clasp arranged brake elements when moved into braking engagement with said brake drum acting through the medium of said structure to move said means into braking and supporting engagement with the brake drum.

9. In a brake mechanism for a railway vehicle truck wheel and axle assembly having a braking surface rotatable therewith, in combination, a cradle member extending longitudinally of the truck, brake elements disposed in clasp arrangement about said braking surface and being slidably carried by said cradle member for movement in directions longitudinally of the member into and out of braking engagement with said braking surface, means carried by said cradle member operable for controlling the operation of said brake element, another brake element movable into and out of braking engagement with said braking surface, means carried by the frame of the truck for supporting said cradle member and being movable relative to said frame by said cradle member upon the braking engagement of said clasp arranged brake elements with said braking surface to move said other brake element into braking engagement with the braking surface, and mechanism for controlling the operation of the means carried by said cradle member.

10. In a brake mechanism for a railway vehicle truck wheel and axle assembly having a braking surface rotatable therewith, in combination, a cradle member located below the axle of said wheel and axle assembly and extending longitudinally of the truck, brake elements disposed in clasp arrangement about said braking surface and being slidably carried by said cradle member for movement in directions longitudinally of the member into and out of braking engagement with said braking surface, means carried by said cradle member operable for controlling the operation of said brake elements, another brake element movable into and out of braking engagement with said braking surface, means located above the axle of said wheel and axle assembly and carried by the frame of the truck for supporting said cradle member and being movable relative to said frame by said cradle member upon the braking engagement of said clasp arranged braking elements with said braking surface to move said other brake element into supporting and braking engagement with the braking surface, and mechanism for controlling the operation of the means carried by the cradle member.

11. In a brake mechanism for a railway vehicle truck wheel and axle assembly, in combination, a brake drum secured for rotation with said wheel and axle assembly, means carried by the frame of the truck and movable relative thereto into and out of braking and supporting engagement with said brake drum, a structure extending longitudinally of the truck located below the axle of said wheel and axle assembly and supported by said means, clasp arranged brake elements carried by said structure for longitudinal movement relative thereto into and out of braking engagement with said drum, mechanism carried by said structure operative to effect the operation of said clasp arranged brake elements, said mechanism comprising horizontally disposed cams arranged one at each end of said structure for actuating the adjacent brake element, vertically disposed shafts operable for actuating said cams, horizontally disposed arms for actuating said shafts and a member movable longitudinally of the structure for actuating said arm simultaneously, and a fluid pressure controlled brake cylinder operative to control the operation of said member, said clasp arranged brake elements when moved into braking engagement with said brake drum acting through the medium of said structure to move said means into braking and supporting engagement with the brake drum.

12. In a brake mechanism for a railway vehicle truck wheel and axle assembly, in combination, a brake drum secured for rotation with said wheel and axle assembly, means located above the axle of said wheel and axle assembly carried by the frame of the truck and movable relative to the frame into and out of braking and supporting engagement with said brake drum, a structure extending longitudinally of the truck located below the axle of said wheel and axle assembly and supported by said means, clasp arranged brake elements carried by said structure for longitudinal movement relative thereto into and out of braking engagement with said drum, mechanism carried by said structure operative to effect the operation of said clasp arranged brake element, said mechanism comprising horizontally disposed cams arranged one at each end of said structure for actuating the adjacent brake element, vertically disposed shafts operable for actuating said cams, a member movable longitudinally of the structure for actuating both of said arms simultaneously and a fluid pressure controlled brake cylinder carried by said means and operative to effect the operation of said member, said clasp arranged brake elements when moved into braking engagement with said brake drum acting through the medium of said structure to move said means into braking and supporting engagement with the brake drum.

13. In a brake mechanism for a railway vehicle truck wheel and axle assembly, in combination, a brake drum secured for rotation with said wheel and axle assembly, means carried by the frame of the truck and movable relative thereto into and out of braking and supporting engagement with said brake drum, a structure extending longitudinally of the truck located below the axle of said wheel and axle assembly and supported by said means, said structure comprising longitudinally extending laterally spaced side pieces arranged one on each side of the brake drum and connected together on each side of the brake drum, clasp arranged brake elements carried by said structure for longitudinal movement relative thereto into and out of braking engagement with said drum, mechanism carried by said structure operative to effect the operation of said clasp arranged brake elements, cam means cooperating with said structure and clasp arranged brake elements operative to actuate the clasp arranged brake elements into and out of braking engagement with said drum, said clasp arranged brake elements when moved into braking engagement with said brake drum acting through the medium of said structure to move said means into braking and supporting engagement with the brake drum.

14. In a brake mechanism for a railway vehicle truck wheel and axle assembly, in combination, a friction braking surface rotatable with said wheel and axle assembly, a brake carrier carried by the frame of the truck and movable relative thereto into engagement with said braking surface, clasp arranged brake elements carried by said brake carrier and slidable relative thereto into braking engagement with said braking surface, said brake elements when moved into braking engagement with said braking surface acting to move the carrier into engagement with the braking surface, and means for actuating said brake elements.

15. In a brake mechanism for a railway vehicle truck wheel and axle assembly, in combination, a friction braking surface rotatable with said wheel and axle assembly, a brake carrier carried by the frame of a truck and movable relative thereto into engagement with said braking surface, said brake carrier comprising a beam portion located above the axle of said wheel and axle assembly and extending longitudinally of the truck for movement into engagement with the braking surface, and also comprising a cradle portion located below said axle and carried by the beam portion, clasp arranged brake elements carried by said cradle portion and movable relative thereto into braking engagement with said braking surface, said brake elements when moved into braking engagement with the braking surface acting to move the carrier into engagement with the braking surface, and means for actuating said clasp arranged brake elements.

16. In a brake mechanism for a railway vehicle truck wheel and axle assembly, in combination, a friction braking surface rotatable with said wheel and axle assembly, a brake carrier carried by the frame of the truck and movable relative thereto into engagement with said braking surface, said brake carrier comprising a beam portion located above the axle of said wheel and axle assembly and extending longitudinally of the truck for movement into engagement with the braking surface and also comprising a cradle portion located below said axle and carried by the beam portion, clasp arranged brake elements carried by said cradle portion and movable relative thereto into braking engagement with said braking surface, means carried by said cradle portion operative to actuate said brake elements, and means carried by said beam portion for actuating the first mentioned means, said brake elements when moved into braking engagement with said braking surface acting to move the carrier into engagement with the braking surface.

17. In a brake mechanism for a railway vehicle truck wheel and axle assembly, in combination, a friction braking surface rotatable with said wheel and axle assembly, a brake carrier carried by the frame of the truck and movable relative thereto into engagement with said braking surface, clasp arranged brake elements disposed one adjacent each end of said cradle portion and movable longitudinally relative thereto into engagement with said braking surface, cam means journaled in the ends of said cradle member operative to actuate said brake elements, and means for actuating said cam means.

18. In a brake mechanism for a railway vehicle truck wheel and axle assembly, in combination, a friction braking surface rotatable with said wheel and axle assembly, a brake carrier carried by the frame of the truck and movable relative thereto into and out of engagement with said braking surface, clasp arranged brake elements carried by said brake carrier and movable relative thereto into and out of braking engagement with said braking surface, said brake elements when moved into braking engagement with said braking surface acting to move the carrier into engagement with the braking surface, means for actuating said clasp arranged brake elements into braking engagement with the braking surface and for controlling the movement of the brake elements out of engagement with said braking surface and release springs cooperating with said cradle portion and the brake elements for moving the brake elements out of engagement with said braking surface.

19. In a brake mechanism for a railway vehicle truck wheel and axle assembly, in combination, a friction braking surface rotatable with said wheel and axle assembly, a brake carrier carried by the frame of the truck and movable relative thereto into engagement with said braking surface, clasp arranged brake elements carried by said brake carrier and movable relative thereto into braking engagement with said brake surface, said brake elements when moved into braking engagement with said braking surface acting to move the carrier into engagement with the braking surface, horizontally disposed cams carried by said carrier and operable for actuating said brake elements, vertically disposed shafts for actuating said cams, and means for actuating each of said shafts, said means comprising a horizontally disposed actuating arm and a slack adjusting mechanism cooperating with said arm and shaft to normally form a driving connection from said arm to said shaft, said slack adjusting mechanism being operable to rotate said shaft and thereby the cam relative to said arm to adjust the brake elements with relation to said braking surface to compensate for wear.

20. In a brake mechanism for a railway vehicle truck wheel and axle assembly, in combination, a friction braking surface rotatable with said wheel and axle assembly, a brake carrier carried by the frame of the truck and movable relative thereto into engagement with said braking surface, clasp arranged brake elements carried by said brake carrier and movable relative thereto into braking engagement with said braking surface, said brake elements when moved into braking engagement with said braking surface acting to move the carrier into engagement with the braking surface, horizontally disposed cams carried by said carrier and operable for actuating said brake elements, vertically disposed shafts for actuating the cams, and an arm for actuating each of said shafts, and a slack adjusting mechanism carried by said arm and normally forming a driving connection between the arm and shaft and being operable independently of the operation of said arm to rotate said shaft and thereby said cam to vary the position of the adjacent brake element relative to said braking surface.

21. In a brake mechanism for a railway vehicle truck wheel and axle assembly, in combination, a friction braking surface rotatable with said wheel and axle assembly, a brake carrier carried by the frame of the truck and movable relative thereto into engagement with said braking surface, clasp arranged brake elements carried by said brake carrier and movable relative thereto into braking engagement with said braking surface, said brake elements when moved into braking engagement with said braking surface acting to move the carrier into engagement with the braking surface, cams carried by said carrier and operable for actuating said brake elements, shafts for actuating said cams and means for actuating said shafts, said means comprising an actuating arm for each shaft and a slack adjusting mechanism cooperating with said arm and shaft to normally form a driving connection from said arm to the shaft, said slack adjusting mechanism being operable to rotate said shaft and thereby the associated cam relative to said arm to adjust the adjacent brake element with relation to said braking surface to compensate for wear, a fluid pressure controlled motor for actuating each slack adjusting mechanism, a fluid conductor through which fluid under pressure is supplied to and released from both of the actuating motors to simultaneously control the operation of the motors, means for moving the actuating arms simultaneously and for controlling the supply of fluid under pressure to and the release of fluid under pressure from said motors.

22. In a brake mechanism for a railway vehicle truck, in combination, a friction braking surface carried by and rotatable with a wheel and axle assembly of the truck, a brake element movable into engagement with said surface, a member carried by the frame of said truck and movable relative thereto for actuating said element into engagement with said surface, slack adjusting mechanism operative to move said element relative to said member and surface, a cradle carried by said member, clasp arranged brake elements carried by said cradle and movable relative thereto into engagement with said surface, said clasp arranged brake elements when moved into engagement with said surface acting through said cradle, member and slack adjusting mechanism to move the first mentioned brake element into engagement with said surface, means for actuating the clasp arranged brake elements, said means comprising a slack adjusting means for each clasp arranged brake element operative to move the brake element relative to said cradle and to said surface, and brake cylinder means operative to actuate said means and to control the operation of all of the slack adjusting mechanism.

CARLTON D. STEWART.